(12) United States Patent
Thorsell

(10) Patent No.: US 10,434,878 B2
(45) Date of Patent: Oct. 8, 2019

(54) INFORMATION SYSTEM FOR A VEHICLE WITH VIRTUAL CONTROL OF A SECONDARY IN-VEHICLE DISPLAY UNIT

(71) Applicant: VOLVO TRUCK CORPORATION, Göteborg (SE)

(72) Inventor: Jonas Thorsell, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/740,362

(22) PCT Filed: Jul. 2, 2015

(86) PCT No.: PCT/EP2015/065075
§ 371 (c)(1),
(2) Date: Dec. 28, 2017

(87) PCT Pub. No.: WO2017/001016
PCT Pub. Date: Jan. 5, 2017

(65) Prior Publication Data
US 2018/0186239 A1    Jul. 5, 2018

(51) Int. Cl.
*B60K 37/02* (2006.01)
*B60K 35/00* (2006.01)
*G02B 27/01* (2006.01)
*G06F 3/14* (2006.01)
(Continued)

(52) U.S. Cl.
CPC .............. *B60K 37/02* (2013.01); *B60K 35/00* (2013.01); *G02B 27/0101* (2013.01); *G06F 3/0481* (2013.01); *G06F 3/1423* (2013.01); *G08G 1/0967* (2013.01); *B60K 2370/155* (2019.05); *B60K 2370/16* (2019.05);
(Continued)

(58) Field of Classification Search
CPC ........ B60K 37/00; B60K 37/02; B60K 37/04; B60K 37/06; B60K 35/00; B60K 2350/925; B60K 2350/2065; B60K 2350/1076; B60K 2350/1072; B60K 2350/352; G08G 1/0967; G02B 27/0101; G02B 2027/0141; G06F 3/1423; G06F 3/0481
See application file for complete search history.

(56) References Cited

U.S. PATENT DOCUMENTS 6,356,812 B1 * 3/2002 Cragun ................ B60K 35/00
                                                    340/990
2010/0037057 A1    2/2010 Shim et al.
(Continued)

FOREIGN PATENT DOCUMENTS

CN    202049742 U    11/2011
EP     2835945 A1     2/2015
(Continued)

OTHER PUBLICATIONS

International Search Report (dated Mar. 14, 2016) for corresponding International App. PCT/EP2015/065075.
(Continued)

*Primary Examiner* — Darlene M Ritchie
(74) *Attorney, Agent, or Firm* — WRB-IP LLP

(57) ABSTRACT

An information system for a vehicle is provided, as is a corresponding method for operating the information system and a thereto related computer program product.

15 Claims, 3 Drawing Sheets

(51) Int. Cl.
*G06F 3/0481* (2013.01)
*G08G 1/0967* (2006.01)

(52) U.S. Cl.
CPC ...... *B60K 2370/31* (2019.05); *B60K 2370/52* (2019.05); *B60K 2370/774* (2019.05); *G02B 2027/0141* (2013.01)

(56) References Cited

U.S. PATENT DOCUMENTS

| | | | |
|---|---|---|---|
| 2011/0029885 A1* | 2/2011 | Camenisch | G06F 3/04815 715/741 |
| 2011/0294490 A1 | 12/2011 | Faenger | |
| 2011/0310001 A1* | 12/2011 | Madau | B60K 37/02 345/156 |
| 2012/0173069 A1* | 7/2012 | Tsimhoni | G01C 21/365 701/25 |
| 2012/0306637 A1* | 12/2012 | McGough | B60K 37/06 340/439 |
| 2013/0238165 A1 | 9/2013 | Garrett et al. | |
| 2014/0220948 A1 | 8/2014 | Xia et al. | |
| 2014/0249717 A1* | 9/2014 | Takahashi | B60R 21/00 701/36 |
| 2014/0309864 A1* | 10/2014 | Ricci | H04W 4/21 701/36 |
| 2015/0010207 A1* | 1/2015 | Inada | B60K 35/00 382/103 |
| 2015/0178034 A1 | 6/2015 | Penilla et al. | |
| 2016/0009294 A1* | 1/2016 | Gunaratne | B60W 50/12 701/36 |
| 2016/0116977 A1* | 4/2016 | Goldman-Shenhar | G06F 3/013 345/156 |
| 2018/0032300 A1* | 2/2018 | Singh | B60K 35/00 |
| 2018/0058879 A1* | 3/2018 | Tayama | B60K 35/00 |
| 2018/0086346 A1* | 3/2018 | Fujisawa | B60Q 3/18 |

FOREIGN PATENT DOCUMENTS

| | | |
|---|---|---|
| GB | 2492789 A | 1/2013 |
| WO | 2007145566 A1 | 6/2007 |
| WO | 2014107513 A2 | 7/2014 |

OTHER PUBLICATIONS

European Official Action (Jun. 18, 2019) for corresponding European App. 15738865.3.

* cited by examiner

INFORMATION SYSTEM FOR A VEHICLE WITH VIRTUAL CONTROL OF A SECONDARY IN-VEHICLE DISPLAY UNIT

BACKGROUND AND SUMMARY

The invention relates to an, information system for a vehicle. The invention also relates to a corresponding method for operating the information system and to a thereto related computer program product.

Many vehicles today are equipped with a vehicle computing system which can include a range of different functions for a vehicle occupant's use. Typically, a "head unit" is arranged slightly offset the vehicle operator's line-of-sight as part of a so called center console. In some implementations the head unit is a connected infotainment unit. The head unit is typically provided with some form of user interface, for example including various resource components such as a screen, speakers, a microphone, a touch screen and/or keypad, etc. A digital instrument cluster arranged within the direct line-of-sight of the vehicle operator and within an instrument duster is also provided, typically displaying a condensed amount of information such as the speed of the vehicle, the fuel level, state of charge, etc.

The bead unit is typically the control center for the automotive entertainment and information center, in some instances having a wireless connection to the web, a cloud server, etc. With a wireless connection the head unit may be arranged to provide status information back to the cloud server and allow software applications, apps for short, to be downloaded and operated on the head unit. Apps are computer software designed to help with performing specific tasks.

As a result of allowing apps to be installed and operated on the head unit, the vehicle occupant's can take advantage of functions for example not readily available at an initial delivery of the vehicle, through the interaction with the user interface components offered by the head unit.

However, allowing apps to be installed and operated on the bead unit also have some disadvantages, fix example relating to a secure operation of the vehicle and specifically in relation to distraction of the vehicle operator. With e.g. various entertaining applications accessible to the vehicle operator, the vehicle operator could be operating the vehicle with divided attention or even taking ones eyes off the road. Vehicle manufacturers are therefore reluctant to allow for apps to be freely downloaded and operated on the head unit of the vehicle.

In addition, according to recent studies done on driving safety, it has been discovered that when a vehicle operator looks at the in-vehicle display screens rather than the road, the vehicle operator is more prone to traffic accidents according to an exponentially increasing probability.

As understood from the above, this will be specifically highlighted in situations where the app is allowed to display information within the instrument cluster arranged within the direct line-of-sight of the vehicle operator. Accordingly, there is a desire, to provide means for improving the operational safety of the vehicle, while still enable a high level of flexibility for using later installed apps.

According to an aspect of the invention, the above is at least partly alleviated by an information system for a vehicle, comprising a primary in-vehicle display unit, a secondary in-vehicle display unit, the secondary in-vehicle display unit arranged within a primary viewing direction of a vehicle operator, and a control unit arranged in communication with the primary and the secondary in-vehicle display unit, wherein the control unit is configured to receive a request from a software application executed by the control unit to, present information within at least one of the primary and the secondary in-vehicle display unit, and control the presentation within the secondary in-vehicle display unit based on a driving condition for the vehicle.

In accordance to the invention, the present vehicle context is taken into account when information is to be displayed within the secondary in-vehicle display unit, the secondary in-vehicle display unit being arranged directly in front of the vehicle operator and thus typically having an in comparison high level of impact on the total attention the vehicle operator may be given to the surrounds when operating the vehicle. The inventive information system will thus typically be given the opportunity to select how and when information may be displayed within the secondary in-vehicle display unit, such that a minimum disturbance is given to the vehicle operator when the vehicle situation rather demands the vehicle operator to place his/her focus on e.g. the road ahead. The inventive concept will in comparison to other prior art solutions be more flexible as to what type of software applications that may be downloaded and operated by the control unit. The reason for this is that the control unit subsequently may remove any disturbances in situations where the vehicle operator needs to be fully focused on maneuvering the vehicle.

In a preferred embodiment, the secondary in-vehicle display unit arranged as a component of an instrument cluster. The classic functionality of the instrument cluster is to provide the vehicle operator with information relating to speed, the fuel level, state of charge, etc., however by means of the invention also information provided from the software application running on the control unit will be allowed to be presented. Such information could for example relate to guiding instructions from a navigation system, condensed information relating to a current song/artist played by a stereo component comprised with the information system, etc. Correctly presented, this information to be displayed within the secondary in-vehicle display unit will in fact give the vehicle operator the possibility to give the surroundings and the road a head a maximum amount of attention, as the vehicle operator may concentrate himself/herself on what is displayed within the secondary in-vehicle display unit rather than seeking further (possibly unnecessary) information within the secondary in-vehicle display unit.

Within the context of the invention, the expression "software application" should be interpreted in the broadest sense, including any kind of software to having information to be presented within at least one of the primary and the secondary in-vehicle display unit. The software application may be previously installed at the initial delivery of the vehicle (e.g. provided by the manufacturer of the vehicle) or later downloaded (e.g. provided by a third party software developer). Also, the expression "executed" should be interpreted broadly, including both directly executed by the control unit arranged within the vehicle and/or where the execution is distributed, for example at least partly shared between the control unit and e.g. a remotely arranged server, such as a cloud server. In addition, a request from the software application is understood to relate to the situation where the software application has information that the software application "wants" to display within at least one of the primary and the secondary in-vehicle display unit.

According to an aspect of the invention, the software application may typically be programmed in a manner to correspond to the dual screen approach provided by means of the presented information system. In an embodiment, the software application may be configured to mirror information to each of the primary and the secondary in-vehicle display unit. However, in a preferred embodiment the software application is designed to independently interface with both of the primary and the secondary in-vehicle display unit, and specifically target the information to be displayed in each of the display units. In some embodiments the primary and the secondary in-vehicle display unit are arranged to have different resolutions, and this information is a parameter known by the software application, taken into account when designing the respective user interface to be displayed within each of the primary and the secondary in-vehicle display unit.

In a possible embodiment, the software application that needs to present information in the secondary in-vehicle display unit generates a graphics view to a virtual display. The virtual display matches the dimensions and resolution of the secondary in-vehicle display unit. In a possible implementation, a control module operating within the control unit takes the virtual display and encodes it to a digital video stream. The encoded digital video stream is subsequently distributed from the control unit to the secondary in-vehicle display unit by means of a there between provided network based connection. The encoded digital video stream is decoded at the secondary in-vehicle display unit where it is displayed.

By using the concept of "virtual display", the actual display hardware of the secondary in-vehicle display unit must not necessarily be "directly" accessed. Rather, the secondary in-vehicle display unit is only receiving the graphical representation to be shown in the secondary in-vehicle display unit (i.e. the display driver is not directly controlled by the control unit). This concept is for example known from e.g. Google Chromecast, Virtual Network Computing (VNC), etc. This type of implementation would give an improved computing security to the vehicle, i.e. by only allowing; "virtual" access for a third party software developer to the instrument cluster. As a consequence, this may make vehicle manufacturer less reluctant to allow third party software applications to be downloaded and operated by the control unit. In such an implementation it may be desirable to arrange the control unit as a "separate" computing device, i.e. where the control unit only has limited direct access to vehicle critical components, thereby minimizing the risk fraudulent access by third party software applications (e.g. hacking).

In an embodiment where the vehicle is e.g. a truck, the later downloaded third party software applications may be an application having a relation to equipment installed after delivery. Such equipment could for example be provided by a professional truck bodybuilder. As an example, the truck, may in one embodiment be provided with a cooling arrangement for allowing delivery of frozen goods. The third party software application may in such au embodiment be arranged to interface with control components of the cooling arrangement, and the software application may be arranged to provide the truck driver with a warning, within the secondary in-vehicle display unit, in case of a problem with the cooling arrangement. The possibility with allowing further (later) third party software applications to be downloaded and executed by the control units reduced the need to install further e.g. display units within the vehicle compartment, thereby reducing the risk of the vehicle operator losing his/her focus on the road ahead of the vehicle.

In a possible alternative embodiment of the invention, the secondary in-vehicle display unit is arranged as component of a Head Up Display (HUD). In such an embodiment the information provided within the secondary in-vehicle display unit will be in the direct line-of-sight for the vehicle operator when looking out through the frontal windscreen. Hence, there will be a necessity to control the actual information being presented within the HUD to minimize any risks with operating the vehicle.

According to a preferred embodiment, the primary in-vehicle display unit is arranged outside of the primary viewing direction. Typically, the primary in-vehicle display unit is arranged as a component of a center consoled within a passenger compartment of the vehicle. In a typical embodiment of the invention, the primary in-vehicle display unit and the control unit are comprised in an in-vehicle entertainment center.

In a possible embodiment of the invention, the driving condition for the vehicle is based on a current activity level for the vehicle operator. Accordingly, the vehicle compartment may be equipped with e.g. one or a plurality of cameras, etc. for determining how the vehicle operator is acting and maneuverings the vehicle. For example, if it is determined that the vehicle operator is fully focused on e.g. rotating the driving wheel, this may be taken as an indication that it would be desirable to not further "choke" the vehicle operator with information. Therefore, in such a scenario it may be desirable to allow the control unit to somewhat suppress the request from the software application to display information within the secondary in-vehicle display unit. Alternatively, the information to be displayed within the secondary in-vehicle display unit may be adapted in a predetermined manner to correspond to the indication of the activity level for the vehicle operator.

In a preferred embodiment of the invention, the driving condition for the vehicle is based on at least one of a present or upcoming vehicle scenario for the vehicle. For example, the vehicle may be equipped with means for analyzing the surrounding of the vehicle, for example by acquiring information from an externally arranged camera, radar device, etc. Thus, in case it e.g. has been determined that a potential obstacle is present in front of the vehicle, this information may be taken into account for controlling how information is presented within the secondary in-vehicle display unit. Furthermore, the vehicle may be equipped with navigation equipment and possibly a GNSS receiver (e.g. a GPS and/or a GLONASS receiver, or similar). Using such devices, and being within the scope of the invention, an upcoming road condition (e.g. a sharp turn, a steep hill, etc.) may be taken into account for controlling how information is presented within the secondary in-vehicle display unit, all for the purpose of keeping the vehicle operator focused in the condition at hand.

Preferably, only a section of the it cluster (i.e. the secondary in-vehicle display unit) is accessible by the control unit for presentation of information. Accordingly, this would allow for a further control of how information is displayed within the secondary in-vehicle display unit.

In an embodiment, the control unit is further configured to execute a plurality of different software applications, e.g. typically a multitasking implementation. In such an implementation it could be possible to equip the vehicle with leavers/control functionality to switch between the different software applications, specifically to provide input as to which software application is to be displaying information within the secondary in-vehicle display unit. Alternatively, or also, the control unit may be configured for making such a selection, for example based on the current driving condition for the vehicle. It is also possible, and within the scope of the invention, to allow more than a single software application to be presented within the secondary in-vehicle display unit.

In a possible embodiment of the invention, the controlling of the presentation within the secondary in-vehicle display unit further comprises controlling a location of presentation of the information within the secondary in-vehicle display unit. In some implementations the information may only be displayed within e.g. one or a few selected areas of the instrument cluster and the location will be fixed to one of these locations. In another implementation the location of presentation of the information within the secondary in-vehicle display unit may be more flexible, possibly dependent on e.g. the current the vehicle condition.

Within the scope of the invention, it is possible to allow a first software application to be presented within the primary in-vehicle display unit and a second software application to be displayed within the secondary in-vehicle display unit, where the second software application is different from the first software application.

According to another aspect of the present invention there is provided a method for operating an information system, the information system comprising a primary in-vehicle display unit, a secondary in-vehicle display unit, the secondary in-vehicle display unit arranged within a primary viewing direction of a vehicle operator, and a control unit, wherein the method comprises the steps of establishing a communication link between the control unit and the primary and the secondary in-vehicle display unit, receiving a request from a software application executed by the control unit to present information within at least one of the primary and the secondary in-vehicle display unit, and controlling the presentation within the secondary in-vehicle display unit based on a driving condition for the vehicle. This aspect of the invention provides similar advantages as discussed above in relation to the previous aspect of the invention.

According to still further aspect of the present invention there is provided a computer program product comprising, a computer readable medium having stored thereon computer program means for operating an information system, the information system comprising, a primary in-vehicle display unit, a secondary in-vehicle display unit, the secondary in-vehicle display unit arranged within a primary viewing direction of a vehicle operator, and a control unit, wherein the computer program product comprises code for establishing a communication link between the control unit and the primary and the secondary in-vehicle display unit, code for receiving a request from a software application executed by the control unit to present information within at least one of the primary and the secondary in-vehicle display unit, and code for controlling the presentation within the secondary in-vehicle display unit based on a driving condition for the vehicle. Also this aspect of the invention provides similar advantages as discussed above in relation to the previous aspects of the invention.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
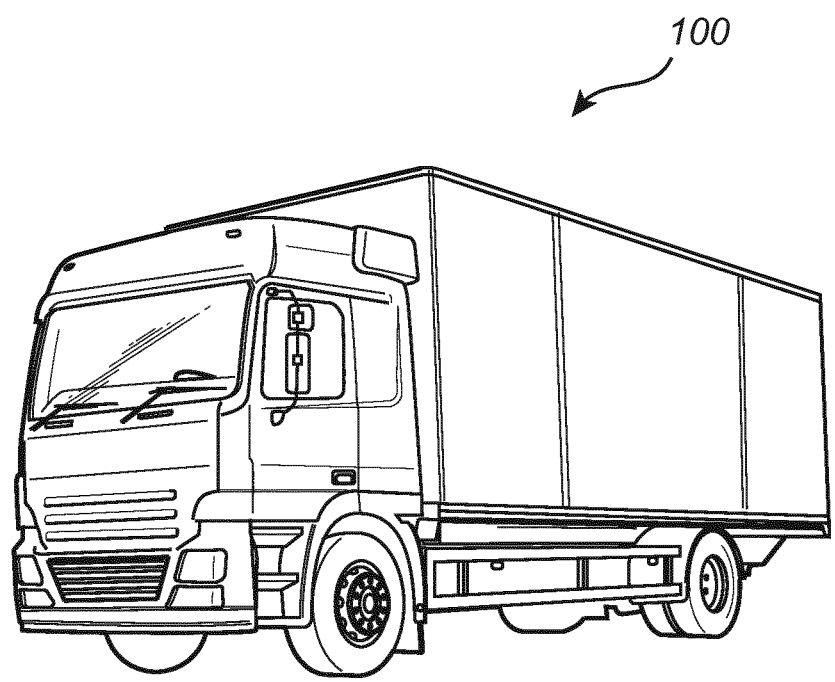
FIG. 1 illustrates a truck comprised with an information system according to a currently preferred embodiment of the invention.

The present invention will now be described more fully hereinafter with reference to, the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 2A:
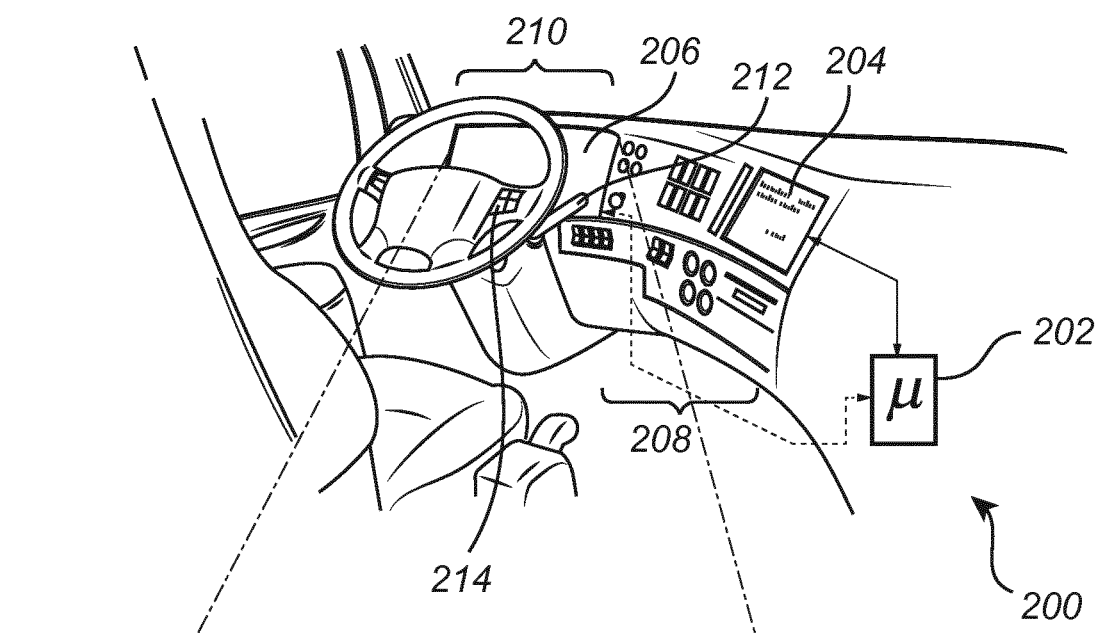
FIGS. 2a and 2b provide exemplifications of the components of the information system and its allocation during operation, and FIG. 3 conceptually illustrates the processing steps for performing the method according to the invention.

Referring now to the drawings and to FIGS. 1 and 2a in particular, there is in FIG. 1 depicted an exemplary vehicle, here illustrated as a truck 100, in which an information system 200 according to the present invention may be incorporated. The information system 200 may of course be implemented, possibly in a slightly different way, in a car.

The information system 200 comprises a control unit 202, where the control unit 202 is configured to receive information from components comprised with the truck 100. Such information may for example include cameras arranged within the vehicle compartment for determining an activity level for the vehicle operator, externally arranged cameras, radar arrangements, etc. for detecting potential obstacles within the surrounding of the vehicle.

The control unit 202 may also be connected to e.g., a communication interface (such as e.g. a CAN bus or similar, or a dedicated communication interface) of the truck 100. Further components may be connected to the control unit 202, including for example arrangements for determination of the position of the truck 100, such as for example a GPS (global positioning system, or similar) combined with reap information, e.g. stored in a local or remote database, and/or e-horizon data stored with the truck 100. The map/e-horizon data may comprise information relating to for example, type of road, and number of traffic lanes and/or any static obstacles on the road.

The control unit 202 may include a general purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or nonvolatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein. The control unit 202 may be provided as a separate unit and/or may at least partly form part of an electronic control unit comprised with the truck 100.

The information system 200 also comprises a primary 204 and a secondary 206 in-vehicle display unit, arranged in communication with the control unit 202. The communication between the control unit 202 and the display units 204, 206 is typically wired, however wireless alternatives are possible and within the scope of the invention. The communication between the control unit 202 and the secondary in-vehicle display unit 206 is typically network based (IP based), i.e. the information to be displayed at the secondary in-vehicle display unit 206 may be sent as encoded packet data between the control unit 202 and the secondary in-vehicle display unit 206, to be decoded at the secondary in-vehicle display unit 206.

The primary in-vehicle display unit 204 is in FIG. 2a arranged as a component of a center consoled 208 within a passenger compartment of the truck 100. The secondary in-vehicle display unit 206 is on the other hand arranged as a component of an instrument cluster 210 of the truck 100. The instrument cluster 210 may be equipped with leavers/controllers 212, e.g., for interacting with a user interface presented within the secondary in-vehicle display unit 206. The vehicle operator may also use e.g. a purposely assigned controller 214 for switching between at least two software applications running simultaneously on the control unit 202.

Figure 3:
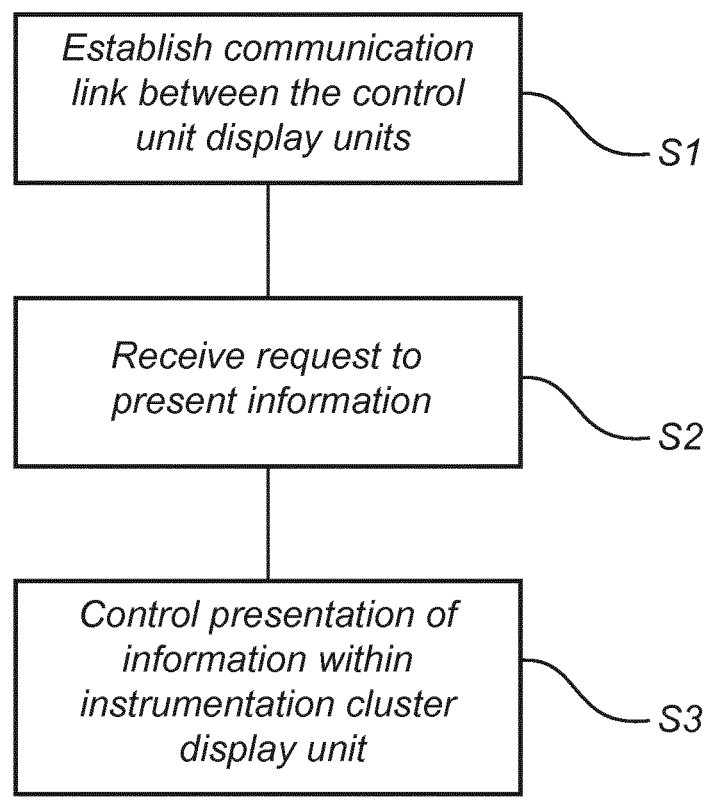

During operation of the information system 200, with further reference to FIG. 3, the process starts by that the control unit 202 establishes, S1, a communication link between the control unit 202 and the primary 204 and the secondary 206 in-vehicle display unit. As mentioned above, at least the communication link between the control unit 202 and the secondary 206 in-vehicle display unit is a network based connection. Thereafter, a request is received, S2, from a software application executed by the control unit 202 to present information within at least one of the primary and the secondary in-vehicle display unit. The request may in some embodiment take the form of an instruction provided from the software application to present information within a specific location within the secondary in-vehicle display unit 206, or to be allocated a specifically sized area of the secondary in-vehicle display unit 206.

Subsequently, the control unit 202 will take the current driving condition for the truck 100 into account and control, S3, controlling the presentation within the secondary in-vehicle display unit 206 based on a driving condition for the truck 100.

The control unit 202 is preferably configured to encode the information that the software application is requesting to be decoded and then displayed within the secondary in-vehicle display unit 206, such that it corresponds to the resolution of a suitable display area within the secondary in-vehicle display unit 206. In FIG. 2a, the current driving condition for the truck 100 indicates that the vehicle operator should be able to handle an in comparison high amount of information. Specifically, the current driving condition for the truck 100 as referred to in relation to FIG. 2a may for example be that the truck 100 is travelling along a straight road with only a limited amount of surrounding traffic.

As is illustrated by display portion 216 of the secondary in-vehicle display unit 206, there is provided navigation related instructions to the vehicle operator, including a map. The navigations instructions as well as the map are provided from a navigation software application being executed on the control unit 202.

Figure 2B:
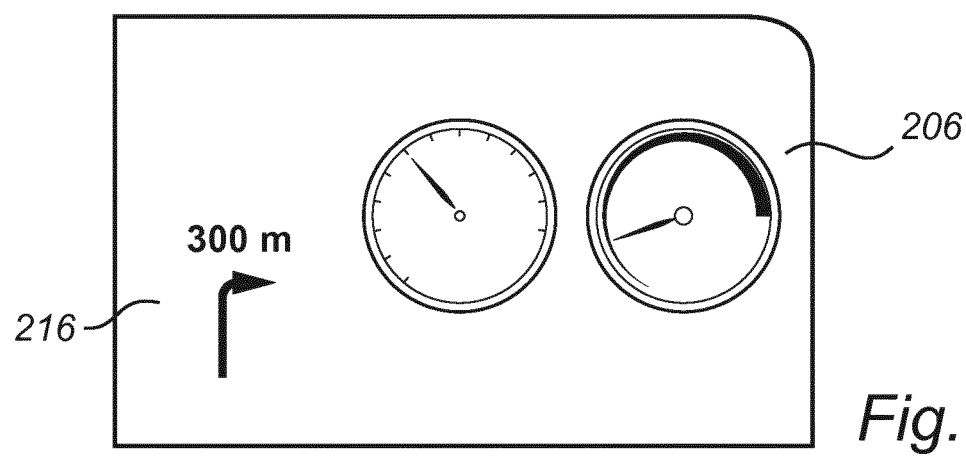

However, in FIG. 2b the scenario has changed. In this scenario the control unit 202 has received information indicating that the truck 100 is approaching a road exit. Accordingly, this information is provided as an input for determining the current driving condition for the truck 100. As the driving scenario has changed to an in comparison more pressing situation for the vehicle operator, an in comparison lower amount of information is suitable for presentation to the vehicle operator. Therefor, the information presented within the display portion 216 of the secondary in-vehicle display unit 206 changes, to solely refer to e.g. an arrow showing a condensed amount of information to the vehicle operator, requiring less mental effort for interpretation. Hence, the vehicle operator can focus his/her attention to the road ahead of the truck 100. The condensed information could also or alternatively be repositioned to another area within the secondary in-vehicle display unit 206, thereby requiring less attention by the vehicle operator.

In addition to the above, it may in one embodiment of the invention be possible to allow the control unit 202 to select which one of a plurality of executing software applications that is to be presented to the vehicle operator. Such a selection is then typically dependent on the current driving condition. Accordingly, the identified driving condition will be used to select a software application that would improve the situation for the vehicle operator. For example, the control unit 202 could receive information that the fuel level for the truck 100 is approaching an empty tank. The control unit 202 could as a response select a software application to be displayed within the secondary in-vehicle display unit 206 that would guide the vehicle operator to the nearest gas station.

In summary, the present invention relates to an information system for a vehicle, comprising a primary in-vehicle display unit, a secondary in-vehicle display unit, the secondary in-vehicle display unit arranged within a primary viewing direction of a vehicle operator, and a control unit arranged in communication with the primary and the secondary in-vehicle display unit, wherein the control unit is configured to receive a request front a software application executed by the control unit to present information within at least one of the primary and the secondary in-vehicle display unit, and control the presentation within the secondary in-vehicle display unit based on a driving condition for the vehicle.

Advantages with the invention includes the possibility of effectively controlling what and how information is displayed within the secondary in-vehicle display unit, typically being the display unit having the largest potential impact on disturbing the vehicle operator when maneuvering the vehicle. The inventive concept will in comparison to other prior art solutions be more flexible as to what may be downloaded and operated by the control unit, as the control unit subsequently may remove any disturbances in situations where the vehicle operator needs to be fully focused on maneuvering the vehicle.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in, the art.

Variations to the disclosed embodiments, can be understood and effected by the skilled addressee in practicing, the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. An information system for a vehicle, comprising:
a primary in-vehicle display unit,
a secondary in-vehicle display unit having given dimensions and given resolutions, the secondary in-vehicle display unit being arranged as a component of an instrument cluster comprised with the vehicle within a primary viewing direction of a vehicle operator, and
a control unit arranged in communication with the primary and the secondary in-vehicle display units,
wherein the control unit is configured to:
receive a request from a software application executed by the control unit to present information within at least one of the primary and the secondary in-vehicle display units, and
control the presentation within the secondary in-vehicle display unit based on a driving condition for the vehicle,
wherein the request comprises an instruction to present information at a specific location within the secondary in-vehicle display unit and the control of the presentation is further based on the instruction, wherein only a section of the instrument cluster is accessible by the control unit for presentation of information, the section within the instrument cluster being configured as a virtual display for presenting information as requested by the software application, whereby the software application is only allowed virtual access to the instrument cluster,
wherein the driving condition for the vehicle is based on at least one of a present or upcoming vehicle scenario for the vehicle, and the vehicle comprises means for analyzing a surrounding of the vehicle for determining the present or upcoming vehicle scenario for the vehicle,
wherein the information to be presented in the virtual display is arranged to match the given dimensions and the given resolutions of the secondary in-vehicle display unit, and a control module operating within the control unit takes the information to be presented in the virtual display and encodes it to a digital stream that is subsequently distributed from the control unit to the secondary in-vehicle display unit by a therebetween-provided networked based connection, and
wherein a display driver of the secondary in-vehicle display unit is not directly controlled by the control unit and the secondary in-vehicle display unit only receives a graphical representation.

2. The information system according to claim 1, wherein the secondary in-vehicle display unit is arranged as component of a Head Up Display (HUD).

3. The information system according to claim 1, wherein the primary in vehicle display unit is arranged outside of the primary viewing direction.

4. The information system according to claim 1, wherein the primary in-vehicle display unit is arranged as a component of a center console within a passenger compartment of the vehicle.

5. The information system according to claim 1, wherein controlling the presentation within the secondary in-vehicle display unit further comprises controlling a location of presentation of the information within the secondary in-vehicle display unit.

6. The information system according to claim 1, wherein the primary in vehicle display unit and the control unit are comprised in an in-vehicle entertainment center.

7. The information system according to claim 1, wherein a controller configured to operate the instrument cluster is adapted to control a location of the section within the instrument cluster for presenting the information.

8. A vehicle, comprising an information system according to claim 1.

9. The information system according to claim 1, wherein the driving condition for the vehicle is based on a current activity level for the vehicle operator within a vehicle compartment of the vehicle.

10. The information system according to claim 9, wherein the vehicle comprises cameras arranged within the vehicle compartment for determining the activity level for the vehicle operator.

11. The information system according to, claim 1, wherein the control unit is further configured to execute a plurality of different software applications.

12. The information system according to claim 11, wherein the control unit is configured to receive a request from the vehicle operator to display information from one of the plurality of different software applications.

13. The information system according to claim 11, wherein the control unit is configured to select, based on the driving condition for the vehicle, at least one of the different software applications for displaying information.

14. A method for operating an information system, the information system comprising a primary in-vehicle display unit, a secondary in-vehicle display unit having given dimensions and given resolutions, the secondary in-vehicle display unit being arranged as a component of an instrument cluster comprised with the vehicle within a primary viewing direction of a vehicle operator, and a control unit, wherein the method comprises the steps of:
- establishing a communication link between the control unit and the primary and the secondary in-vehicle display units,
- receiving a request from a software application executed by the control unit to present information within at least one of the primary and the secondary in-vehicle display units, and
- controlling the presentation within the secondary in-vehicle display unit based on a driving condition for the vehicle, wherein the request comprises an instruction to present information at a specific location within the secondary in-vehicle display unit and the control of the presentation is further based on the instruction, wherein only a section of the instrument cluster is accessible by the control unit for presentation of information, the section within the instrument cluster being configured as a virtual display for presenting information as requested by the software application, whereby the software application is only allowed virtual access to the instrument cluster,
- wherein the driving condition for the vehicle is based on at least one of a present or upcoming vehicle scenario for the vehicle, and the vehicle comprises means for analyzing a surrounding of the vehicle for determining the present or upcoming vehicle scenario for the vehicle,
- wherein the information to be presented in the virtual display is arranged to match the given dimensions and the given resolutions of the secondary in-vehicle display unit, and a control module operating within the control unit takes the information to be presented in the virtual display and encodes it to a digital stream that is subsequently distributed from the control unit to the secondary in-vehicle display unit by a therebetween-provided networked based connection, and
- wherein a display driver of the secondary in-vehicle display unit is not directly controlled by the control unit and the secondary in-vehicle display unit only receives a graphical representation.

15. A computer program product comprising a computer readable medium having stored thereon computer program for operating an information system, the information system comprising a primary in-vehicle display unit, a secondary in-vehicle display unit having given dimensions and given resolutions, the secondary in-vehicle display unit being arranged as a component of an instrument cluster comprised with the vehicle within a primary viewing direction of a vehicle operator, and a control unit,
- wherein the computer program product is configured to:
  - establish a communication link between the control unit and the primary and the secondary in-vehicle display units,
  - receive a request from a software application executed by the control unit to present information within at least one of the primary and the secondary in-vehicle display units, and
  - control the presentation within the secondary in-vehicle display unit based on a driving condition for the vehicle,
- wherein the request comprises an instruction to present information at a specific location within the secondary in-vehicle display unit and the control of the presentation is further based on the instruction, wherein only a section of the instrument cluster is accessible by the control unit for presentation of information, the section within the instrument cluster being configured as a virtual display for presenting information as requested by the software application, whereby the software application is only allowed virtual access to the instrument cluster,
- wherein the driving condition for the vehicle is based on at least one of a present or upcoming vehicle scenario for the vehicle, and the vehicle comprises means for analyzing a surrounding of the vehicle for determining the present or upcoming vehicle scenario for the vehicle,
- wherein the information to be presented in the virtual display is arranged to match the given dimensions and the given resolutions of the secondary in-vehicle display unit, and a control module operating within the control unit takes the information to be presented in the virtual display and encodes it to a digital stream that is subsequently distributed from the control unit to the secondary in-vehicle display unit by a therebetween-provided networked based connection, and
- wherein a display driver of the secondary in-vehicle display unit is not directly controlled by the control unit and the secondary in-vehicle display unit only receives a graphical representation.

* * * * *